Figure 1:
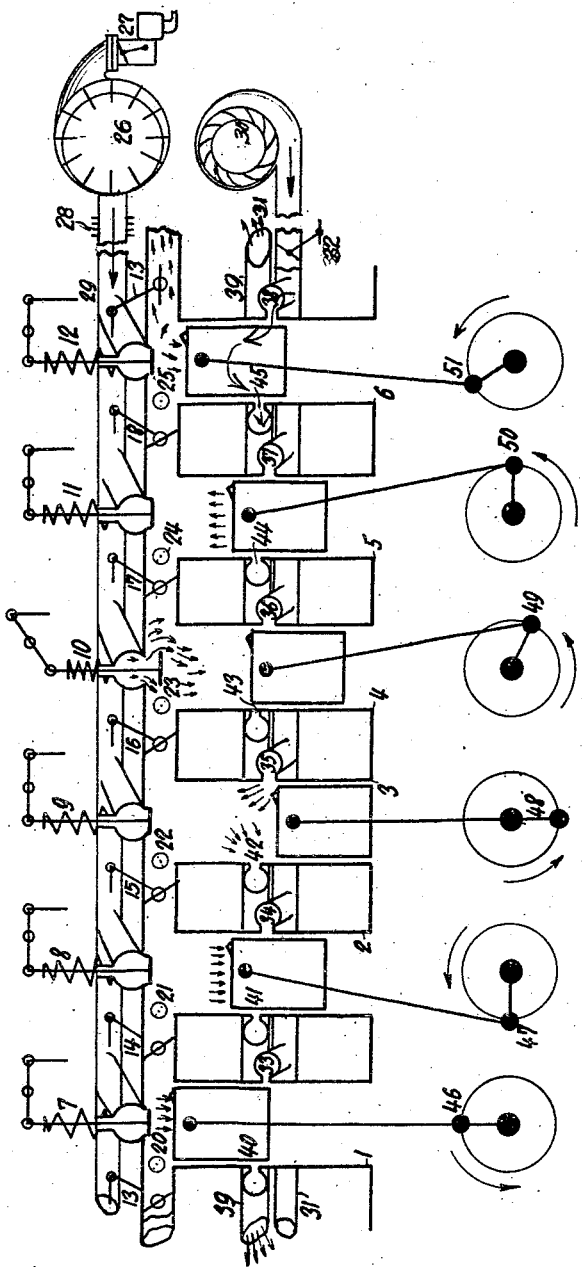

Oct. 6, 1931.  P. DUGELAY  1,826,306
INTERNAL COMBUSTION ENGINE
Filed Aug. 23, 1928  5 Sheets-Sheet 1

Inventor,
Paul Dugelay
By John B. Brady atty.

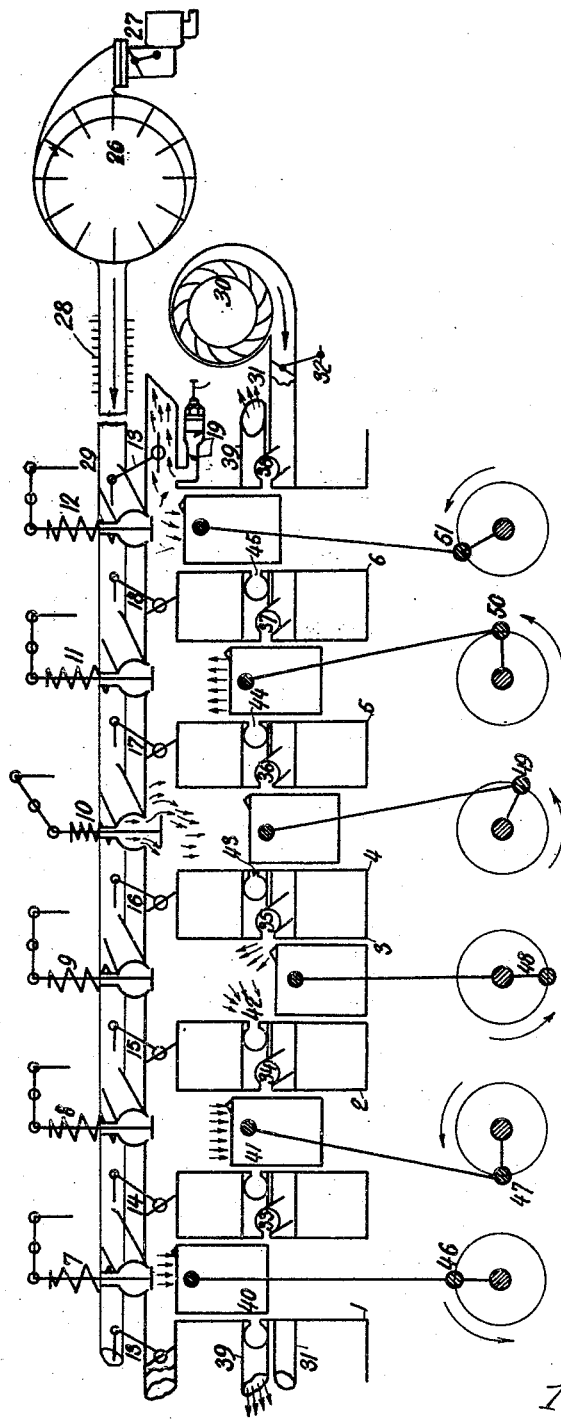

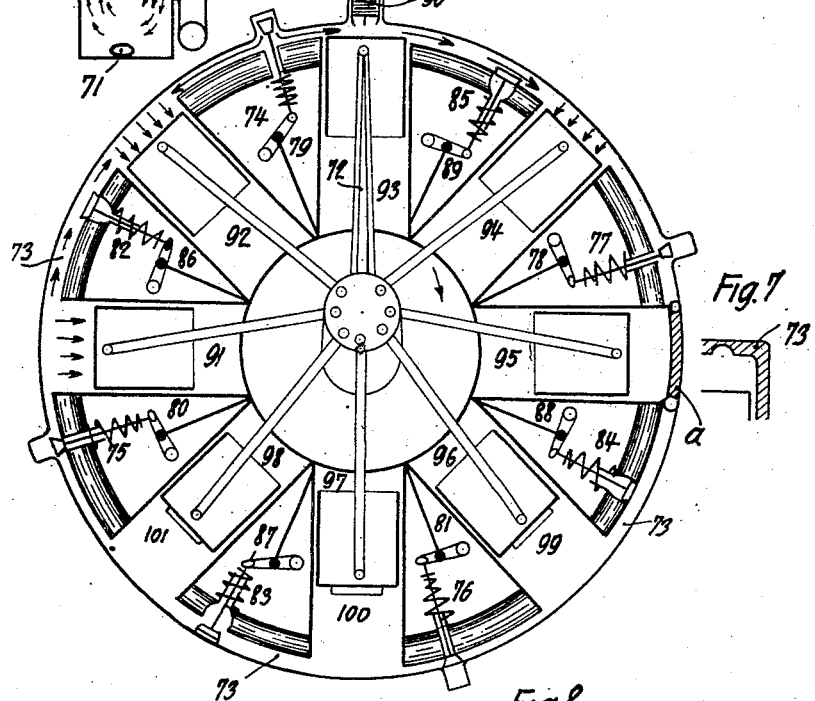

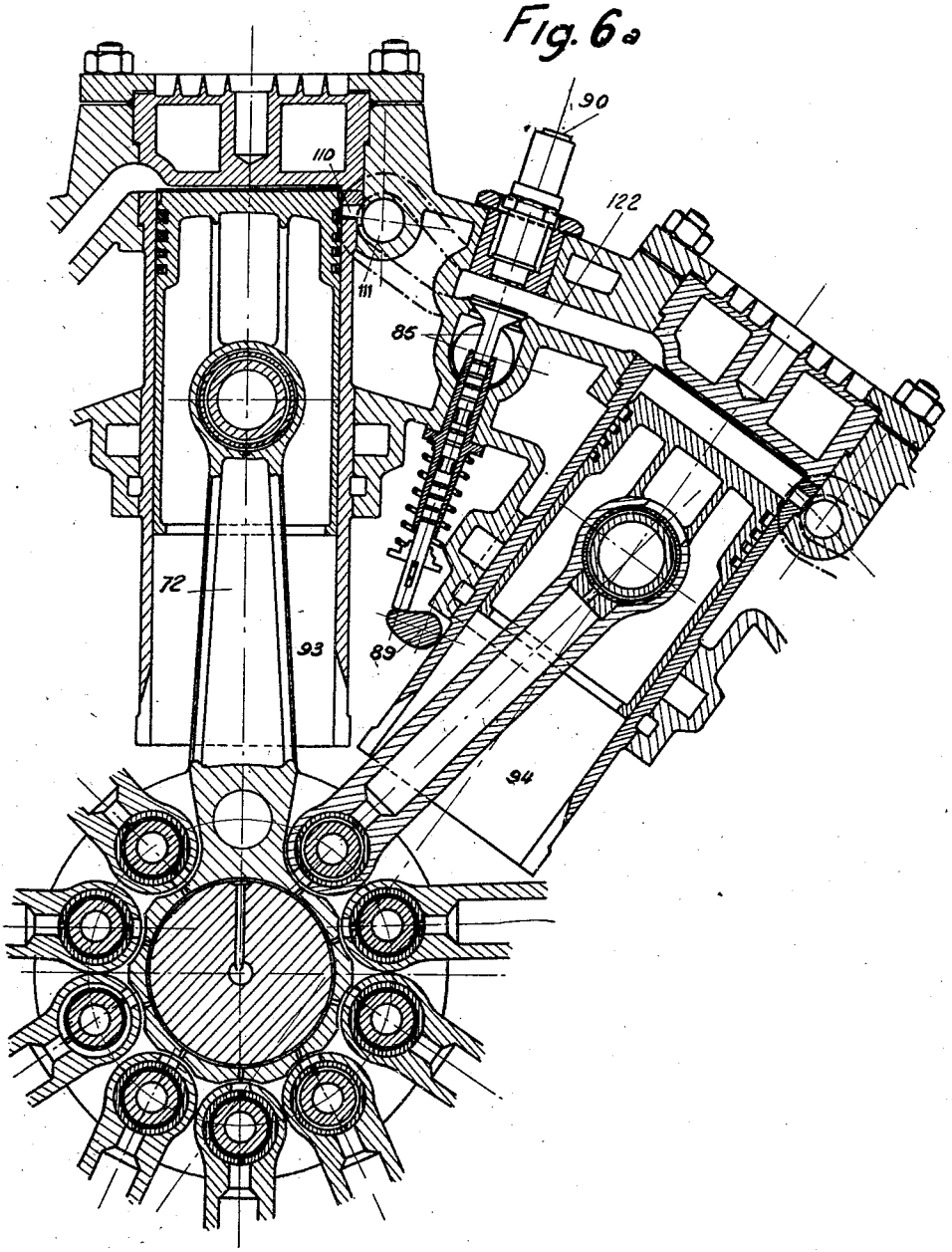

Oct. 6, 1931.        P. DUGELAY        1,826,306
INTERNAL COMBUSTION ENGINE
Filed Aug. 23, 1928    5 Sheets-Sheet 5
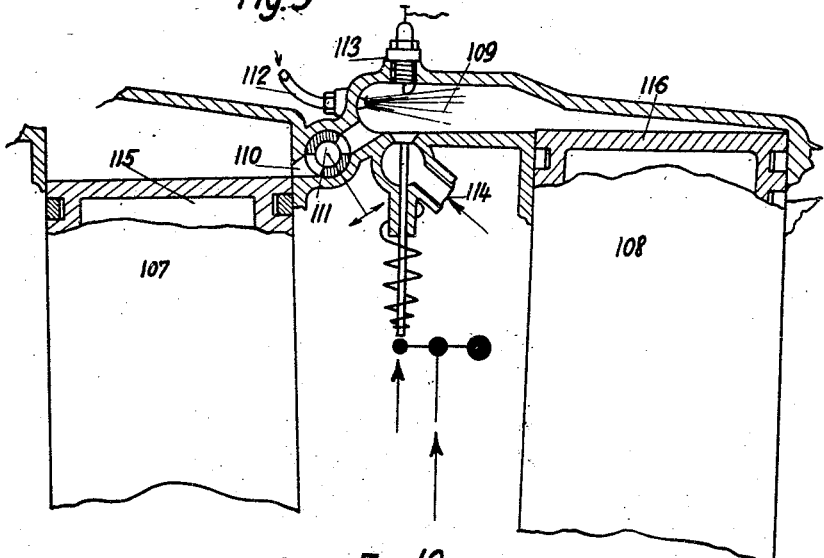
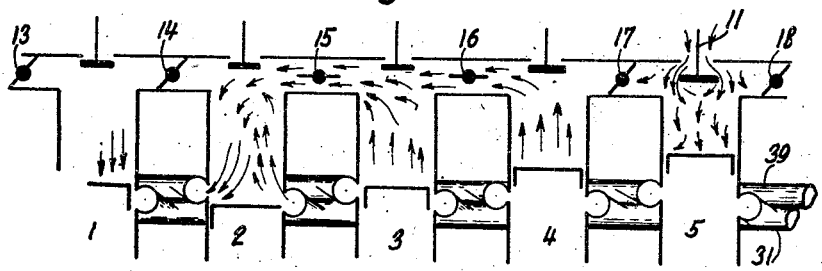
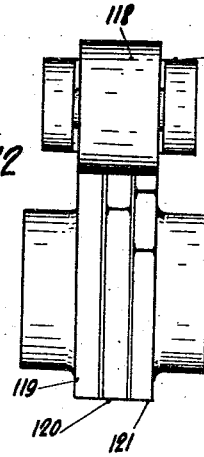
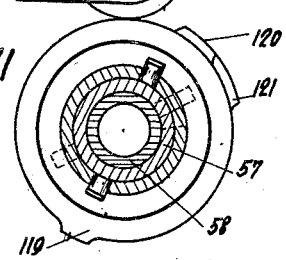
INVENTOR
Paul Dugelay
By John B. Brady
attorney Patented Oct. 6, 1931

1,826,306

UNITED STATES PATENT OFFICE

PAUL DUGELAY, OF PARIS, FRANCE, ASSIGNOR TO SOCIETE DES MOTEURS DUGELAY, OF PARIS, FRANCE, A LIMITED COMPANY OF FRANCE

INTERNAL COMBUSTION ENGINE

Application filed August 23, 1928, Serial No. 301,649, and in France September 16, 1927.

The present invention relates to internal combustion engines and applies to the improvement of the operation of internal combustion engines employed more particularly in the automobile art and aviation, and to engines of high power of various uses.

The engine device which is the object of the present invention comprises characteristics capable of modifying completely the conditions of construction and utilization of engines by eliminating in the automobile the changing of speed and in extending considerably the margin of power in aviation. In certain particular applications this arrangement makes possible the achievement of a high power engine.

These devices apply more particularly to the familiar cycles of four complete periods for one revolution and one explosion in turn. The accompanying familiar processes of compression for admission, scavenging, exhaust, are provided either by a compressor and a fan, or by a compressor fulfilling the two functions. In the utilization of compression and scavenging apparatus, pressure controlling devices are provided.

It is known that for high degrees of compression high tension ignition presents great difficulties, by virtue especially of the resistance of the mixture to the spark. The present motor comprises two particular ignition devices:

1. A high tension plug ignition mounted either in a chamber independent from the cylinder and connected to this latter by way of a channel having a controlled valve, or directly in the cylinder. In this latter case the high tension ignition insures functioning, particularly for moderate loads and up to compressions now used in automobile work.

2. A communication between cylinders is obtained by means of a passage which connects the compression chambers of neighboring cylinders. A valve for the passage placed between two successive cylinders is controlled and provides ignition with variation in ignition position, either in advance or in retard by variable keyed control. This latter arrangement involves the succession of the motor timing in the order of the cylinders and in the conveniently chosen keyed positions of the piston.

In certain cases, for ignition in fixed position at high speed a small orifice may function as a valve by loss of charge and insure ignition between cylinders with a supplementary valve for the orifice by a piston at the end of the upward stroke.

Assuming the above ignition arrangements there is not in the present engine, any relation between the number of spark plugs and the number of cylinders. The engine may be disposed either for one ignition plug per cylinder, or for one plug per N cylinders, since it is sufficient to ignite the line of firing to insure running of the engine.

For the mechanical attainments of the conditions of working above described it is necessary to consider for the different elements that:

(a) To achieve admission under pressure, at different positions of the stroke and during a small portion of the stroke, any plug, valve or sleeve may be employed.

(b) For the control of admission any cam device, eccentric or otherwise, enabling a control in position during working may be employed.

(c) For the ignition valve any plug, gate, sleeve or other device may be employed. For the control of the said valve any cam device, eccentric or otherwise permitting a regulation of position may be employed with any of the suitable cooling devices.

(d) For ignition at fixed position any orifice for loss of charge or other communication device may be employed with or without piston valve control.

(e) All the independent controls or all combinations of simultaneous maneuvering of the control devices between them, susceptible of responding to the conditions of service are considered within the present patent and the characteristics described render to this type of motor a variable couple. The continuity of explosions makes it possible to maintain the maximum couple at all speeds and in this case the avoidance in particular of change in speed in automobile work.

For the arrangement of the cylinders and the reduction of the number of members radial combination appears the best. The radial type engine may be equipped either with a system of valves and throttle per cylinder, or with any combination of common feed to two or several cylinders, attaining between them a common explosion chamber. By thus increasing the number of cylinders the cooling surfaces are increased to obtain highest compressions. The devices in line are attainable every time so that the firing line may be insured under normal conditions.

The particular arrangements of this motor enable the construction of a motor comprising considerable number of cylinders in conjunction with suitable gearing and in this case the application of an explosion chamber common to several cylinders is indicated.

The invention will be more clearly understood by reference to the accompanying drawings, in which:

Figure 1 is a scheme of working of a radial six cylinder engine developed in line with compressor and fan with a spark plug in each cylinder; Fig. 1a represents the same motor with a single spark plug in an independent chamber; Fig. 2 is a section of the control cams for admission and ignition having variable positioning; Fig. 3 is the transverse section of a cam with helicoidal grooves; Fig. 4 is the end view of a cam with its roller and rocker member; Fig. 5 is a transverse section of a cylinder with the arrangement of manifolds for scavenging and exhaust; Fig. 6 is a schematic section of an eight cylindered engine with the cylinders grouped two by two in common cylinder housings; Fig. 6a shows a detailed cross-sectional view of a portion of a ten-cylinder motor arranged in star; Fig. 7 is a section of a cylinder end and the position of the circular passage of communication between cylinders; Fig. 8 is a section of a group of cylinders developed in line, with an orifice of small dimensions for ignition between cylinders; Fig. 9 is a section of two cylinder heads of the radial type engine having a head between the cylinders; Fig. 10 is a diagrammatic developed section of the functioning of a six cylindered radial type engine, partial representation of Fig. 1; Fig. 11 is a side view of the combined cam system of the control for the valves; and Fig. 12 is a view of the face of the cams combined with variable setting for the control of the valves.

Referring more particularly to Fig. 1, it is necessary to consider cylinders 1, 2, 3, 4, 5, 6 with their pistons in the characteristic positions of the cycle, the single crank common to all the connecting rods being represented with keyings necessary for the explanation. Each cylinder is equipped with an admission valve, an ignition valve and a spark plug. All the explosion chambers communicate by a passage between cylinders placed at the head of the compression chamber. In the order of the cylinders the admission valves with their rocker control comprise numbers 7, 8, 9, 10, 11, and 12. The valves of the communication passage between cylinders are numbered in the order 13, 14, 15, 16, 17 and 18. The spark plugs are disposed in the cylinder directly, according to the scheme in positions and in the order of the cylinders 20, 21, 22, 23, 24 and 25.

Certain elements to the right of the line $xy$ of Fig. 1 are shown separately in continuation below the rest of Fig. 1, and are as follows: A rotary compressor 26 draws in the air carbureted from the carburetor 27 provided with a normal butterfly valve control, for flowing back by the eventual intermediary of a cooler 28 to the collector for the admission valves 29. A scavenging fan 30 draws in the cold air and discharges into the collector 31 which possesses a pressure control by means of a butterfly valve 32. The collector insures the scavenging of the cylinders by the orifices at the cylinders 33, 34, 35, 36, 37 and 38. The exhaust of the gases takes place by way of the manifold 39 connected to the cylinders by the orifices at the bottom of the stroke designated in the order 40, 41, 42, 43, 44 and 45. The various positions of the crank 46, 47, 48, 49, 50 and 51, are given for facility of explanation in the characteristic positions of the cycle. The cylinder 1 is at the end position of stroke and in explosion position, that is, valves 13—14 closed, and valve 7 closed. The cylinder 2 is at the end of the explosion stroke, valves 14—15 closed, valve 8 closed. The cylinder 3 is at exhaust and scavenging valves 15—16 closed, valve 9 closed, exhaust by way of orifice 42 and scavenging by way of orifice 35. The cylinder 4 is in position of closed exhaust and scavenging at the time of admission with the valve 10 open and valves 16—17 closed. The cylinder 5 is in position of closed admission and compression, all the orifices being closed. The cylinder 6 is at the end of compression and ignition position, the admission valve 12 being closed, the ignition valve 13 open and 18 closed. The cylinder 6 is in communication with the cylinder 1 at the commencement of the explosion. The cylinder 1 is in position of explosion after ignition with valve closed, to facilitate the explanation of the cycle upon Fig. 1.

Fig. 1a represents an alternative construction wherein the spark plug 19 is disposed in an independent chamber communicating with the cylinder block by a passage controlled by a valve.

For the ignition by the spark plug 19 this function will be insured normally at the position of the cylinder 6 at the time of explosion if the valve is open. All the controls of valves and ignition valves converge radially, in the star type of motor considered, upon a system of cams. The shaft of the engine, as shown in Fig. 2, carries, retained by a nut and a lock-nut 52, two control cams 53—54. Each cam actuates either a throttle line or a valve line by the intermediary of a valve roller of the type 55—56. The shaft of the motor carries on one side a hollow arm provided with two concentric pins or sleeves 57—58. Upon the motor shaft two mortices 59—60 enable the mounting of two sliding collars 61—62 which are fixed in the pins 57—58. The concentric pin or sleeve 57 carries at the outer end a grooved neck portion 63 provided with a roller control lever 64. By means of this lever 64 the sleeve actuates the collar 61 and varies the setting of the cam 53 by the means of two helicoidal grooves 65—66 formed in the cam 53. The pin 58 also carries a grooved neck portion 67 and a lever and roller 68 by means of which it is actuated and controls the collar 62 to cause the setting of the cam 54 to vary by the action of two helicoidal grooves 69—70.

Fig. 3 shows the section of a cam 53 with the helicoidal groove 66.

Figure 4 shows an end view of the cam 53 with its collar 61 and the roller and rocker member 55.

Figure 5 shows in a star form motor an arrangement of mounting with the cylinder, exhaust and scavenging manifolds, and the piston during exhaust at the end of the cylinder. There is shown the passage between the cylinders 71. This arrangement is applied also to the schematic section shown in Fig. 6, of an eight cylindered engine in groups of two cylinder housings common to two cylinders. This motor provided with a master connecting rod 72 carrying seven connecting rods comprises a continuous communication passage between cylinders 73 upon which are disposed four valves of the plug type 74, 75, 76, and 77 controlled by four rocker members 79, 80, 81, and 78. Each valve insures the ignition of a group of two cylinders at the end of compression placing into communication with the preceding at the period of explosion by opening the valve. The admission valves 82, 83, 84 and 85, disposed also concentrically are controlled respectively by the rockers 86, 87, 88, 89. A single spark plug 90 placed on one cylinder insures the ignition of the line of firing. The cycle as described, and illustrated in Fig. 6, remains the same the cylinders being simply coupled two by two and the distributing members providing for the two cylinders.

The cylinders 91, 92, 93, 94, 95, 96, 97 and 98 are thus grouped two by two in the order according to 91—92, 93—94, 95—96, 97—98, and the positions of the figure give for:

91—92—Explosion.

93—94—Ignition with a little advance from the fact that 93 is alone at the end of stroke, by the opening of the valve 74 and by the spark plug for starting or in case of misfire.

95—96—Explosion and commencement of exhaust for the cylinder 96 by the orifice 99.

97—98—Exhaust by the orifice 100 and 101.

The arrangement of Fig. 6 is more particularly indicated for the applications with a large number of cylinders and in these applications it is possible to group more than two cylinders with a common explosion chamber between valves either to simplify the construction, or for improving the cooling, or for any other reason.

Fig. 6a shows a detailed cross-sectional view of a part of a ten-cylinder motor arranged in star. In Fig. 6a the intercommunication canal has been designated as 122, the orifice of loss of charge by 110, and the cut-off as seen from the end by 111. The other reference characters of Fig. 6a are the same as those of Fig. 6.

Fig. 7 shows for the end of a stroke with detrimental space reduced the longitudinal section of the wall end of the cylinder path 95 of Fig. 6 with the passage between the cylinders 73.

Fig. 8 shows two cylinders 102—103 having a common explosion chamber with admission for the two cylinders by means of the admission valve 104. These two cylinders communicate with the neighboring groups by way of orifices of small dimensions 105—106 performing the function of valves, by loss of charge, an arrangement applicable under certain conditions with supplementary piston obturation.

This loss of charge is occasioned by loss of kinetic energy, due to both external friction with the pipe walls and internal friction in the gas caused by eddies as in restricted passages. Because of this loss of kinetic energy, a certain time elapses before the gaseous mass carrying the quantity of heat necessary to ignite the gases reaches the next cylinder. This time corresponds, according to my invention, to the interval between the ignition moments determined by the arrangement of the cylinders as to time displacement, i. e., lag or lead. This loss of kinetic energy depends on the length and cross-section of these orifices. The incandescent gases escape through these orifices with a certain speed limited by the existence of the loss of charge. Therefore they do not ignite the mixture in the following cylinder until after the passage of a certain time. There is thus obtained synchronization of the continuous operation of the line of fire with the rotation of the motor.

In certain particular conditions and notably in the case of motors running slowly, the above arrangement is applicable with supplementary cut-off by the pistons. In this case, especially, since the loss of kinetic energy can be obtained with orifices which can be used in practice, it may be insufficient to render the interval between two successive ignitions sufficiently large to obtain synchronism between the ignitions and the rotation of the motor. The supplementary cut-off by the piston, which advances sufficiently far in the stroke to again cover the orifice entirely or partially, permits compensating for the advance of the ignition which would be produced without this cut-off.

All the mechanical arrangements of the embodiments indicated in the figures are given solely by way of explanation and in particular the arrangement of the control cams of variable setting, illustrated in Figs. 2, 3 and 4, only constitute one example of demonstration.

Another object of my invention is to provide an advantageous arrangement of the combustion chamber and the particular control of the valves for obtaining certain conditions of pressure and scavenging in the cylinders. In this arrangement the piston is intended to move to the end of the head which is of suitable shape to permit a regular distribution of pressure upon the piston after the commencement of the explosion. The combustion chamber should occupy the greater portion of the space between the cylinders, so that the valved passage between the cylinders may be as short as possible so as to reduce losses of charge by resistance to the flow of the gases and facilitate the setting into ignition. The valved passage established to facilitate the flow of the gases is intended to enable an instantaneous distribution of the pressures between the explosion chambers at the commencement of the explosion and in consequence for the fuel, for example it should enable the compression values to be forced to very much higher values than those employed at the present time, by reducing the maximum explosion pressure and in avoiding the risk of detonation, auto-ignition being avoided by the preliminary cooling of the air or carbureted gas admitted under pressure. An engine of continuous firing type may operate with the injection of heavy fuel. The admission of air under pressure will take place under the same conditions as those of the carbureted gas in the case of working by usual fuel, that is to say at variable position and pressure.

The engine of continuous firing type described hereinbefore has been called an explosion engine, in the case of operation with heavy fuel oil, assuming the particular characteristics of this engine, the injection may be regulated so as to employ a very short period to conserve in the motor the character of a rapid combustion and high efficiency engine, that is to say an explosion engine.

For working under injection the initial setting into ignition may take place electrically or by cartridge or by auto-ignition, in this latter case by the temperature of compression. In the case of ignition by compression temperature the opening of the valves should be very small upon the commencement of the injection but this opening should be such that the communication between cylinders may be achieved at the instant of full combustion. According to the number of cylinders and according to the conditions of control it may be advantageous to cause communication at the instant of explosion of more than two cylinders, in all cases the indicator diagram obtained by the continuous firing type engine is characterized by its indented form.

The ignition valves may be regulated to insure, in addition to their service for igniting and distributing the pressures between two cylinders or more, a scavenging of the combustion chambers and in each cylinder, an initial pressure of zero up to the opening of the admission valve. In this case in each cylinder, taking into consideration the order of firing, the valve in front, that is to say the ignition valve of the following cylinder, will be controlled to open also after the exhaust and the scavenging end of the stroke and to close also before the opening of the admission under pressure. Under these conditions there is achieved for each cylinder across the combustion chamber and the communication passage with the following cylinder a current of scavenging air directed in the same direction as the line of firing; with the rise of the piston the air continues to flow without creating counter pressure upon the piston up to the moment the admission valve opens under pressure.

The control for closure may, like the control for opening the admission under pressure, employ variable setting, these controls being established to enable regulation of the inter-relation of the admission valve openings under pressure and closure of the valve for all rising positions of the pistons. The control of the valves may thus give rise to two periodic movements in turn:

A movement obtained by any convenient system of cams or other arrangement for the opening and closure of the valve insures the action of ignition and interlocking, this latter being with variable setting.

Movement obtained by any convenient system of cams or other arrangement for the control of the opening for scavenging at the end of the valve combined with the control movement for the opening of the admission valve under pressure.

As regards the other figures the members will be designated by numerals taken consecutively with reference to the numerals designating the members in the previous figures.

Fig. 9 represents a section of two cylinders 107 and 108 of an engine of continuous firing type constructed with radial cylinders and comprising a passage between each cylinder provided with a controlled valve. The head 109 of elongated shape occupies the greater portion of the space between the cylinders and the passage 110 carrying the valve is very short and of appropriate section. The head comprises on the other hand an oil injection device 112 in its axis and spark plug 113. When the engine is running so as to insure by a sufficient compression the initial stroke by auto-ignition the spark plug is eliminated. The admission valve, controlled by pressure 114, insures the admission of carbureted gases when using ordinary gasoline or other carburent, and the admission of air in the case of running by the injection of fuel oil. In Fig. 9 the piston 115 is at a position corresponding to the commencement of the explosion. The valve 111 is open for setting into ignition and for the distribution of the pressures between the cylinders 107 and 108, the piston 116 of the cylinder being at this instant at the end of its stroke in position for ignition and commencement of the explosion.

Fig. 10 represents a part of the diagrammatic section of Fig. 1 from cylinder 1 to cylinder 5; the elements which are not necessary for explanation have not been shown with reference numerals. The cylinder 1 is at the explosion end of the stroke, the valves 13 and 14 being closed; the cylinder 2 is in exhaust and scavenging, the exhaust occurs by way of collector 39 and the scavenging by way of the collector 31; the cylinders 3 and 4 are in the rising position of the piston and scavenging of the heads between cylinders by way of the open valves 15 and 16; the cylinder 5 is in air or gas admission under pressure by way of the open valve 11, the valves 17 and 18 being closed.

Figs. 11 and 12 show by way of explanation a system of control cams for the valves, Fig. 11 being the side view along the section of the control shaft and Fig. 12 being the front view. A rocker bar 117 with roller for the control of the valve has its roller 118 controlled by three connected cams 119, 120, 121. The cam 119 controls the variable ignition; the cam 120 controls the opening of the valve at the end of the stroke for scavenging, it is keyed rigidly upon the control shaft; the cam 121 controls the closure of the valve in conjunction with the control of the opening of the admission valve under pressure. This cam 121 is of variable setting type.

The cam 119 mounted on the shaft with a lead which one can cause to vary by any familiar kind of a control determines the opening of a cut-off in the vicinity of the high dead point of the cylinder for assuring the ignition of the combustible mixture contained in the cylinder by the gases in combustion in the preceding cylinder. The cams 120 and 121 in reality constitute only a single one; the bosses of these cams overlap, one obtains the effect of a single cam of variable length since the cam 120 is fixed and 121 is mobile. This arrangement assures the opening of the cut-off in the vicinity of the low dead point in order to permit the scavenging of the cylinder by communication with the preceding cylinder; the variation of the lead of the cam 121 by a control connected with that of the admission valves makes it possible to cause to vary the time of opening of the cut-off, in other words the moment when the scavenging is terminated, as a function of the moment when the admission is open.

For the control of variation of setting of the cams 119 and 121 the system described by way of indication in this specification and comprising in the control shaft of the cam two concentric tubes indicated upon Fig. 3 with the same numerals 57 and 58 as those of the Fig. 2, may be utilized as well as any other suitable form of mechanical device enabling the achievement of the conditions of service above described.

Having now particularly described and ascertained the nature of my said invention and in what manner the same is to be performed, I declare that what I claim is:—

1. A two-cycle internal combustion motor comprising in combination, a plurality of cylinders, means for admitting carbureted gas under controllable pressure, means for admitting scavenging air under controllable pressure, an intercommunication canal between certain of said cylinders having narrowed portions, said canal being maintained permanently open and being calibrated to provide proper retardation in successive cylinders without valve controlling means.

2. A two-cycle internal combustion motor comprising in combination, a plurality of cylinders, means for admitting carbureted gases under controllable pressure, means for admitting scavenging air under controllable pressure, and an intercommunication canal maintained permanently open between certain of said cylinders and having narrowed portions of suitable lengths and sections whereby suitable loss of kinetic energy and the necessary lag are effected for obtaining proper retardation of ignition in the successive cylinders without valve controlling means in said canal.

3. A two-cycle internal combustion motor comprising in combination, a plurality of cylinders, means for admitting the carbureted gases under controllable pressure, means for admitting the scavenging air under controllable pressure, and an intercommunication canal maintained permanently open between certain of said cylinders having narrowed calibrated portions and controlled cut-offs between others of said cylinders whereby suitable loss of kinetic energy and the necessary lag are effected for obtaining the proper retardation of ignition in the successive cylinders.

PAUL DUGELAY.